UNITED STATES PATENT OFFICE.

WILLIAM MASON, OF HARTFORD, CONN., ASSIGNOR TO COLT'S PATENT FIRE ARMS MANUFACTURING COMPANY, OF SAME PLACE.

IMPROVEMENT IN PROCESSES OF BRAZING.

Specification forming part of Letters Patent No. 215,013, dated May 6, 1879; application filed March 28, 1879.

*To all whom it may concern:*

Be it known that I, WILLIAM MASON, of Hartford, county of Hartford and State of Connecticut, have invented an Improved Process of Brazing, of which the following is a specification.

This invention relates to that class of processes employed for brazing or hard-soldering together the parts of metallic articles. It is particularly applicable to the brazing together of the two barrels, the ribs, and the lump of double-barreled guns, but may also be applied to other articles.

In carrying out my invention in its application to double gun-barrels, the two barrels, the ribs, and the lump are prepared for brazing by being clamped together with iron clamps, or bound together with wire bands wrapped around the pieces, wedges being driven under the bands to key the barrels, ribs, and lump tightly together in exactly the relative positions they are intended to occupy when the brazing is completed. Wires or strips of a composition of copper, tin, and zinc, or of other fusible material suitable for brazing, are laid along the joints where brazing is required, and this brazing material is held in place by the same clamps or wire bands which fasten together the parts to be brazed.

The barrels and their attachments, bound together as described, are placed in a cylindrical or tapering case, preferably an iron tube, which is longer than the barrels and large enough to leave considerable space between the barrels and the case. I have found that a wrought-iron pipe of three and one-half inches internal diameter and one-fourth of an inch thickness, open at the ends, makes a suitable receptacle for the barrels of an ordinary double-barreled shot-gun.

The space between the barrels and the walls of the tube is packed full of powdered charcoal or clay, or other suitable porous material, which will not, when heated, affect the parts or the brazing material injuriously, but will pack closely around the parts, keep them from contact with the tube, and permit the escape at the ends of the tube of the gases evolved in the process of heating.

The ends of the tube may be closed with plugs of moist clay or plaster, or even of iron luted in; but holes must be pierced through the end plugs to permit gas to escape freely.

The tube and contents having been thus prepared are placed in a heating-furnace and heated to the proper temperature for melting the brazing material and producing its flow into the joints between the pieces.

During the heating, and while the brazing material is melted, it is usually necessary to keep turning the tube about its axis, which may be done by rolling it on the floor of the furnace, or by having it suspended in bearings within the furnace in which the tube may be turned. The tube may also occasionally be tipped lengthwise by lifting the opposite ends alternately, to equalize the distribution of the molten brazing material along the joints; but this is not always necessary.

The melting of the brazing material will usually be indicated by the color of the flame, which is seen at the vent-holes in the end plugs of the tube, and the work should remain in the furnace for a few minutes after this indication is first shown. The tube and contents are then removed from the furnace and allowed to cool slowly, the rolling movement of the tube being continued outside the furnace until the brazing material has become solidified by cooling. After this the tube containing the barrels is allowed to become cold before opening it to remove the work. The iron tube may be used several times.

To apply my invention to the brazing of articles other than gun-barrels, no different definite instructions are needed. It is, however, desirable to so shape the metallic or other rigid case for containing the articles that the thickness of the porous packing may be as uniform as practicable in order that the different parts of the article may be simultaneously heated alike, while it is also well to so shape the outside of the case that it may easily be tipped or turned in the furnace in order to insure the proper distribution of the brazing material.

It is necessary to perforate the wall or the cover of the case, or to provide otherwise for the escape of gas. The clamps and wires by which the parts are held together, if of metal, become brazed to the articles they hold, and usually must be removed by chipping and filing.

I am aware that gun-barrels have been brazed by surrounding them with clay put on in a plastic condition and permitted to harden, the barrels thus covered being heated in a furnace; but this is a difficult and hazardous process, for the clay is liable to become broken off in the furnace, and thus expose the valuable barrels to unequal and injurious heating.

In my process the case serves to retain the porous covering of the articles to be brazed in its proper place, and permits the whole to be manipulated within the furnace without danger of displacing the pieces, their covering, or the brazing material.

I am also aware that articles are case-hardened by heating them in an iron box containing animal charcoal.

I claim as my invention—

The process above described of brazing together the parts of metallic articles, which consists in heating them in the presence of brazing material, and while surrounded by a porous material contained in a ventilated case of rigid refractory material.

In testimony whereof I have hereunto set my hand this 25th day of March, 1879.

WILLIAM MASON.

Witnesses:
WM. R. HOPKINS,
WM. E. DICKINSON.